(12) United States Patent
Paulsen et al.

(10) Patent No.: US 9,876,226 B2
(45) Date of Patent: Jan. 23, 2018

(54) ALUMINUM DRY-COATED AND HEAT TREATED CATHODE MATERIAL PRECURSORS

(75) Inventors: Jens Paulsen, Daejeon (KR); JiHye Kim, Baeksogdong (KR); HeonPyo Hong, BaekSeokDong (KR)

(73) Assignee: Umicore, Brussels (BE)

( * ) Notice: Subject to any disclaimer, the term of this patent is extended or adjusted under 35 U.S.C. 154(b) by 473 days.

(21) Appl. No.: 13/817,326

(22) PCT Filed: Aug. 4, 2011

(86) PCT No.: PCT/EP2011/063456
§ 371 (c)(1),
(2), (4) Date: Mar. 26, 2013

(87) PCT Pub. No.: WO2012/022624
PCT Pub. Date: Feb. 23, 2012

(65) Prior Publication Data
US 2013/0175469 A1 Jul. 11, 2013

Related U.S. Application Data

(60) Provisional application No. 61/344,555, filed on Aug. 20, 2010.

(30) Foreign Application Priority Data

Aug. 17, 2010 (EP) .................................... 10008563

(51) Int. Cl.
*H01M 4/525* (2010.01)
*C04B 35/626* (2006.01)
(Continued)

(52) U.S. Cl.
CPC ........ *H01M 4/525* (2013.01); *C01G 45/1221* (2013.01); *C01G 51/42* (2013.01);
(Continued)

(58) Field of Classification Search
CPC ...... H01M 4/525; H01M 4/366; H01M 4/505; C04B 35/01; C04B 35/62675;
(Continued)

(56) References Cited

U.S. PATENT DOCUMENTS 8,535,832 B2 * 9/2013 Karthikeyan et al. ..... 429/231.1
2002/0071991 A1 * 6/2002 Kweon et al. ............. 429/231.1
(Continued)

FOREIGN PATENT DOCUMENTS

EP 1637503 3/2006
JP 8069902 3/1996
(Continued)

OTHER PUBLICATIONS

Toyoki Okumura et al Journal of Power Sources 189 )2009) 471-475.*
(Continued)

*Primary Examiner* — Peter F Godenschwager
*Assistant Examiner* — Andrew J. Oyer
(74) *Attorney, Agent, or Firm* — Brinks Gilson & Lione (57) ABSTRACT

Aluminum dry-coated and heat treated cathode material precursors. A particulate precursor compound for manufacturing an aluminum coatedlithium transition metal (M)-oxide powder usable as an active positive electrode material in lithium-ion batteries includes a transition metal (M)-oxide core and a non-amorphous aluminum oxide coating layer-covering the core. By providing a heat treatment process for mixed metal precursors that may be combined with an aluminum dry-coating process, novel aluminum containing precursors that may be used to form high quality nickel based cathode materials are obtained. The aluminum dry-coated and heat treated precursors include particles have,
(Continued)

20 μ compared to prior art precursors, relatively low impurity levels of carbonate and/or sulfide, and can be produced at lower cost.

14 Claims, 8 Drawing Sheets (51) Int. Cl.
$C04B\ 35/01$ (2006.01)
$C01G\ 51/00$ (2006.01)
$C01G\ 53/00$ (2006.01)
$C01G\ 45/12$ (2006.01)
$H01M\ 4/36$ (2006.01)
$H01M\ 4/505$ (2010.01)
$H01M\ 10/0525$ (2010.01)
$H01M\ 10/052$ (2010.01)
$C04B\ 35/628$ (2006.01)

(52) U.S. Cl.
CPC .............. $C01G\ 51/44$ (2013.01); $C01G\ 53/42$ (2013.01); $C01G\ 53/44$ (2013.01); $C04B\ 35/01$ (2013.01); $C04B\ 35/62675$ (2013.01); $C04B\ 35/62813$ (2013.01); $H01M\ 4/366$ (2013.01); $H01M\ 4/505$ (2013.01); $C01P\ 2002/50$ (2013.01); $C01P\ 2002/52$ (2013.01); $C01P\ 2002/72$ (2013.01); $C01P\ 2002/77$ (2013.01); $C01P\ 2004/03$ (2013.01); $C01P\ 2004/51$ (2013.01); $C01P\ 2004/61$ (2013.01); $C01P\ 2004/84$ (2013.01); $C01P\ 2006/12$ (2013.01); $C01P\ 2006/40$ (2013.01); $C01P\ 2006/60$ (2013.01); $C01P\ 2006/80$ (2013.01); $C04B\ 2235/3203$ (2013.01); $C04B\ 2235/3262$ (2013.01); $C04B\ 2235/3275$ (2013.01); $C04B\ 2235/3279$ (2013.01); $C04B\ 2235/44$ (2013.01); $C04B\ 2235/5409$ (2013.01); $C04B\ 2235/5436$ (2013.01); $C04B\ 2235/5472$ (2013.01); $C04B\ 2235/721$ (2013.01); $C04B\ 2235/726$ (2013.01); $H01M\ 10/052$ (2013.01); $H01M\ 10/0525$ (2013.01)

(58) Field of Classification Search
CPC ...... C04B 35/62813; C04B 2235/5409; C04B 2235/3279; C04B 2235/5472; C04B 2235/721; C04B 2235/3203; C04B 2235/44; C01G 51/42; C01G 53/42; C01G 51/44; C01G 53/44; C01G 45/1221
See application file for complete search history.

(56) References Cited

U.S. PATENT DOCUMENTS

2006/0089257 A1* 4/2006 Albrecht .............. C01G 53/006
502/335
2007/0292763 A1* 12/2007 Park et al. ................ 429/231.1

FOREIGN PATENT DOCUMENTS

| JP | 10116603 | 5/1998 |
| JP | 2001106534 | 4/2001 |
| WO | WO 2009057834 | 5/2009 |
| WO | WO 2009/074311 | * 6/2009 |

OTHER PUBLICATIONS

Huang et al., "A Modified $Al_2O_3$ Coating Process to Enhance the Electrochemical Performance of $Li(Ni_{1/3}Co_{1/3}Mn_{1/3})O_2$ and its Comparison with Traditional $Al_2O_3$ Coating Process," Journal of Power Sources, vol. 195, No. 24, (Jul. 15, 2010), pp. 8267-8274.
International Search Report, issued in PCT/EP2011/063456, dated Nov. 3, 2011.
International Preliminary Report on Patentability, issued in PCT/EP2011/063456, dated Oct. 5, 2012.

* cited by examiner

ALUMINUM DRY-COATED AND HEAT TREATED CATHODE MATERIAL PRECURSORS

This application is a National Stage application of International Application No. PCT/EP2011/063456, filed Aug. 4, 2011, which claims the benefit of U.S. Provisional Application No. 61/344,555, filed Aug. 20, 2010. This application also claims priority under 35 U.S.C. §119 to European Patent Application No. 10008563.8, filed Aug. 17, 2010.

TECHNICAL FIELD OF THE INVENTION

The present invention relates to precursors for cathode materials used in rechargeable lithium batteries and, more particularly, to particulate mixed transition metal oxide $MO_2$, hydroxide $M(OH)_2$ or oxyhydroxide MOOH precursors coated with aluminum during a dry-coating process that is followed by an additional heat treatment process.

BACKGROUND OF THE INVENTION

Rechargeable lithium and lithium-ion batteries are, due to their high energy density, widely used as power sources for portable electronic devices such as cellular phones, laptop computers, digital cameras or video cameras. Commercially available lithium-ion batteries typically consist of a graphite-based anode and an active cathode where lithium ions can reversibly be embedded and released.

Previously, $LiCoO_2$ was the most used cathode material. However, $LiCoO_2$-based cathode materials are expensive and typically have a relatively low capacity of about 150 mAh/g. Therefore, a substitution of $LiCoO_2$ by materials such as lithium nickel oxide based cathodes (LNO), such as $LiNi_{0.8}Co_{0.2}O_2$, nickel rich lithium nickel manganese cobalt oxides (LNMO), such as $LiNi_{0.5}Mn_{0.3}Co_{0.2}O_2$, or lithium nickel manganese cobalt oxides (LMNCO), such as $LiNi_{0.33}Mn_{0.33}Co_{0.33}O_2$, is in progress. However, an important concern with these layered oxides is their thermal instability in organic electrolytes. If the battery is charged, potentially, the delithiated cathode reacts with the electrolyte, creating heat which speeds up the reaction which ultimately might cause "thermal runaway" meaning the cell explodes. Doping of the cathode, if it lowers the reactivity of the cathode with electrolyte, can help to improve the safety of the cells. It is commonly known that aluminum can be doped into these cathode materials. It is also widely accepted that aluminum doping improves the safety properties of these materials. For example, whereas $LiNi_{0.8}Co_{0.2}O_2$ is practically not applied due to a relatively high thermal instability, a related aluminum doped material (NCA) $LiNi_{0.8}Co_{0.15}Al_{0.05}O_2$, is commercially available. Generally, if aluminum is doped into a layered cathode material with a layer structure, the reversible capacity decreases by 1-2 mAh per mol % of aluminum. Thus, $LiNi_{0.8}Co_{0.2}O_2$ has about 200 mAh/g reversible capacity at 4.3-3.0 V but 5% Al doped material (NCA) has about 190-194 mAh/g. This decrease in capacity, however, may be acceptable if the gain in improved safety is relatively significant.

Moreover, for applications where the energy density might be less important, for example for large size batteries like HEV or EV batteries, Li—Mn—O spinel and $LiFePo_4$ based cathode materials are currently considered based on their better safety performance, despite their much lower energy density than above mentioned LNO, LNMO, and LMNCO materials.

Research has indicated that the solid solution "solubility" of aluminum in LNMCO cathode materials is relatively high, that the thermal instability decreases and therefore the safety increases relatively fast with an increasing aluminum doping level, and that relatively significant amounts of aluminum can be doped into LMNCO cathode materials while retaining a higher volumetric energy density than Li—Mn—O spinel or $LiFePo_4$ based cathode materials. Considering these facts, it is obvious that aluminum doping with relatively high concentrations, for example >5 mol % Al/(Al+transition metal) may be a promising approach to achieve cathodes with superior performance compared to Li—Mn—O spinel and $LiFePo_4$ based cathode materials.

A major problem, however, is that doping with aluminum is not a simple process. At production scale LNMCO cathodes are typically prepared from mixed metal precursors such as mixed transition metal hydroxide $M(OH)_2$ or oxyhydroxide MOOH. The precursors are typically obtained by a precipitation of a base and acid solution, for example, $2NaOH+MSO_4 \rightarrow M(OH)_2+Na_2SO_4$, possibly in the presence of a chelating agent like $NH_4OH$. The precursor is then usually mixed with a lithium source (for example, $Li_2CO_3$) followed by a simple solid state reaction. While it is possible to dope aluminum into the precursor, the problem exists that aluminum does not fit easily into the $M(OH)_2$ structure since the transition metal is divalent while aluminum is trivalent. As a result, instead of an $M(OH)_2$ structure more complex structures such as layered double hydroxides, containing anionic impurities and crystal water, are obtained. It is further much more difficult to obtain a good morphology. For example, under conditions (such as temperature, pH, and so on) where $M(OH)_2$ would precipitate with a good morphology, $Al(OH)_3$ might be soluble causing a relatively poor morphology. Typical for co-precipitation with aluminum is a relatively low density and the obtained powder consists usually of unstructured fluffy agglomerates instead of nicely developed particles.

An alternative known approach is the coating with aluminum through a separate precipitation following the precipitation of the $M(OH)_2$ structure. Under ideal conditions an $Al(OH)_3$ layer will coat the $M(OH)_2$ core. Such approach is described in EP1637503A1 where a lithium-nickel based cathode precursor is coated by an amorphous layer of aluminum hydroxide in a wet aluminum coating process. Wet aluminum coating is a relatively difficult process that often results in a relatively poor morphology since a sufficient density of the $Al(OH)_3$ film might not be achieved. The existing impurity problem as described above may not be solved and it may be very difficult to achieve high doping levels of aluminum (>5 mol %) through wet aluminum coating due to the formation of relatively thick coating layers. Furthermore, wet aluminum coating is a relatively expensive process.

Coating of cathodes or cathode precursors has been described in the previous art. Dry coating by nano particles as fumed silica, fumed alumina, fumed zirconium, etc has been disclosed, but to our knowledge disclosures are limited to very small coating levels, typically not exceeding 1% by weight.

On a large scale precipitated metal hydroxides are in the known prior art mostly prepared by precipitating a base solution of NaOH with an acidic solution of $MSO_4$ in the presence of a chelating agent, such as $NH_4OH$. The obtained mixed metal hydroxide precursors, generally prepared by this cheap industrial route, contain impurities, which are undesired. The main impurities of interest are sulfate (typically 0.1-1 wt % $SO_4^{2-}$), carbonate (typically 0.1-1 wt %

$CO_3^{2-}$), and sodium. The sulfate originates from the $MSO_4$ and the carbonate originates (a) from carbonate impurities in the NaOH and (b) from $CO_2$ in the air. As can be seen, it is relative difficult to avoid carbonate. The sulfate and carbonate impurities are positioned within the crystal structure and, therefore, may not be easily removed, for example by washing.

For preparing the final cathode material, such as LNMCO, lithium is added in the form of e.g. lithium carbonate or hydroxide. As lithium carbonate as well as lithium sulfate based salts are thermodynamically stable, the carbonate and sulfur impurities tend to remain in the final LNMCO cathode. A particular problem poses a carbonate impurity in Li—Ni-oxide based cathodes (such as $LiNi_{0.8}Co_{0.15}Al_{0.05}O_2$). The carbonate impurity causes poor high temperature performance of cells containing such cathode materials, such as swelling or bulging. A high quantity of sulfur impurities is possibly contributing to poor cathode performance and is, preferably, avoided. What is needed in the art is a coating process that enables the formation of particulate mixed transition metal oxide $MO_2$, hydroxide $M(OH)_2$ or oxyhydroxide MOOH precursors doped with aluminum that have an improved morphology and a lower impurity concentration compared to the known prior art.

It is a principal object of the present invention to provide novel precursors that enable the preparation of higher quality aluminum doped cathode materials, such as LNMCO or NCA cathode materials, at lower cost compared to currently available precursors.

In JP08-069902 a thermistor ceramic is disclosed, comprising a calcined manganese-nickel-copper-based oxide to which 0.1-20.0 wt % of aluminum oxide and/or zirconium oxide is added during grinding, after which the ground material is moulded and baked. In this method, neither aluminum oxide nor zirconium oxide forms a solid solution with the manganese-nickel-copper-based oxide, but is present in dispersed form at the grain boundary. There is no formation of an aluminum oxide coating on the ceramic.

In JP10-116603 a battery is disclosed that comprises: a positive electrode in which a manganese oxide is the active material, a negative electrode, and a non-aqueous electrolyte, and at least one type of additive selected from among $Al_2O_3$, $In_2O_3$, $Ga_2O_3$, $Tl_2O_3$, $LiAlO_2$, $LiInO_2$, $LiGaO_2$ and $LiTiO_2$ is added to the manganese oxide. However, in the formation of the positive electrode, according to the examples, alumina ($Al_2O_3$) was admixed with manganese dioxide ($MnO_2$) which had been dehydrated at 400° C., in a proportion of 5 mol with respect to 100 atoms of manganese. The resulting mixture, carbon powder serving as a conducting agent, and a fluororesin powder serving as a binder were mixed in a weight ratio of 8:1:1 and compression moulded into a disc shape, and this was then subjected to heat-treatment at 250° C. in order to produce the positive electrode. By heat-treating such a mixture, alumina and carbon will compete to coat the manganese oxide, and it is impossible to form a continuous coating of alumina.

SUMMARY OF THE INVENTION

Briefly described, the present invention addresses the shortcomings of prior art precursors suitable for preparation of cathode materials for rechargeable lithium and lithium-ion batteries by providing particulate mixed transition metal oxide $MO_2$, hydroxide $M(OH)_2$ or oxyhydroxide MOOH precursors that have been coated with aluminum during a dry-coating process. The powdered particles of the precursors of the present invention include for example a core of nickel/manganese/cobalt oxyhydroxide or nickel/cobalt hydroxide and a surface that is coated with crystalline alumina ($Al_2O_3$) nano particles.

The coated particles of the precursor in accordance with the present invention show a size dependent composition where the relative aluminum content decreases with increasing particle size. This is desirable to achieve good safety, which is because smaller particles contribute more to the surface of the powder. The reactions between electrolyte and cathode take place on the surface. On the other hand, if Al causes a deterioration of electrochemical performance (particularly of the Li diffusion) then the effect is less in the case of small particles. Thus it is beneficial if the Al concentration increases with decreasing particle size.

The present invention further provides an aluminum dry-coating process that enables the formation of precursors with higher doping levels of aluminum than currently possible with known prior wet aluminum coating processes. This can be reached by mixing particulate transition metal oxide $MO_2$, hydroxide $M(OH)_2$ or oxyhydroxide MOOH with alumina in one or more coating procedures. The alumina can be obtained by precipitation, spray drying, milling, etc. In one embodiment the alumina typically has a BET of at least 50 $m^2$/g and consists of primary particles having a d50<100 nm, the primary particles being non-aggregated. In another embodiment fumed alumina is used. Fumed alumina nano-particles are produced in high temperature hydrogen-air flames and are used in several applications that involve products of every day use. The crystalline structure of the fumed alumina is maintained during the coating procedures and is, therefore, found in the coating layer surrounding the $MO_2$, $(OH)_2$ or MOOH core.

The present invention provides further a heat treatment for particulate mixed transition metal oxide $MO_2$, hydroxide $M(OH)_2$ or oxyhydroxide MOOH precursors that allows to reduce undesirable impurities, such as carbonate and sulfate. The heat treatment may be combined with the aluminum dry-coating process in accordance with one embodiment of the present invention to obtain aluminum coated precursors that have improved characteristics compared to known prior art precursors by including particles that have a mixed metal oxide core surrounded by a crystalline aluminum coating layer as well as low impurity levels.

Furthermore, the aluminum dry-coated and pretreated precursors in accordance with an advantageous embodiment of the present invention are basically free of crystal water and have, thus, the advantage over the known prior art that much less gas flow during large scale production is needed, which means that the throughput in a furnace can be increased lowering production cost considerably.

In one embodiment, the precursor compound according has a general formula (M-oxide)$_a$·(Al$_2$O$_3$)$_b$, wherein a+(2*b)=1, and the transition metal (M) is Ni$_x$Mn$_y$Co$_z$, wherein 0.3≤x≤1.9, 0≤y≤0.45, and 0≤z≤1.4, x+y+z=1. The transition metal (M) may further include only unavoidable impurities.

BRIEF DESCRIPTION OF THE DRAWINGS

The present invention will now be described, by way of example, with reference to the accompanying drawings, in which.

The exemplification set out herein illustrates preferred embodiments of the invention, in one form, and such exemplification is not to be construed as limiting the scope of the invention in any manner.

DETAILED DESCRIPTION OF THE INVENTION

In one embodiment of the present invention an aluminum dry-coating process is provided as a first step, that enables achievement of higher doping levels (than in the prior art) of aluminum in particulate transition metal oxide $MO_2$, hydroxide $M(OH)_2$ or oxyhydroxide MOOH precursor compounds. The transition metal (M)-oxide, (M)-hydroxide or (M)oxyhydroxide may be obtained by coprecipitation of the sulfates of the elements constituting said transition metal M in the presence of an alkali hydroxide. For example, a nickel/manganese/cobalt precursor compound with the composition MOOH (M=$Ni_xMn_yCo_z$ with $0.3 \leq x \leq 0.9$; $0 \leq y \leq 0.45$ and $0 < z \leq 0.4$ and $x+y+z=1$) or a nickel/cobalt precursor compound with the composition $M(OH)_2$ may be dry-coated with aluminum oxide (alumina) by filling a mixer, such as a 2L Haensel type mixer, with a certain volume consisting of the particulate precursor and alumina ($Al_2O_3$) powder (see also Example 1 and Example 2). The mixer is then rotated at a constant speed, for example 1000 rpm, for a time period of, for example, 30 min. During this mixing time, the alumina particles slowly fade out of sight coating the MOOH powder particles and the volume in the mixer decreases. The mixing time may be chosen such that no traces visible to the naked eye of the alumina remain in the end. At that time also the volume does not decrease anymore during mixing. Nano-sized fumed alumina may be used in the process.

The quantity of the particulate precursor and the alumina may be chosen, for example, such that a doping level of 5 mol % alumina is achieved during one coating procedure. Thus, 5 mol % of alumina may be added per 1 mol mixed transition metal precursor. While this ratio of quantities was found to be working well other ratios may also be used. To achieve higher doping levels of aluminum, the described coating procedure may be repeated several times. A doping level of aluminum of 10 mol % may, therefore, be achieved by performing a first coating procedure with 5 mol % of alumina followed by a second coating procedure with 5 mol % of alumina. Consequently, a doping level of alumina of 15 mol % may be achieved by performing three consecutive coating procedures utilizing 5 mol % of alumina each time.

While the volume of the alumina exceeds the volume of the mixed metal oxide, hydroxide or oxyhydroxide precursor by far, the coated precursor has about the same volume as the original mixed metal hydroxide or oxyhydroxide precursor. The $MO_2$, MOOH or $M(OH)_2$ powder does not change the color much during the coating procedures. Consequently, the alumina may cover the particles of the precursor with a thin, transparent, relatively dense film.

The final quality of the cathode material prepared from mixed metal precursors depends on the impurity level. Besides obvious impurities like Fe, Cr, Na, . . . also anionic impurities are important. In the case of LNC or LNCA (lithium nickel based cathodes) a carbonate impurity in the final product is highly unwanted. To avoid carbonate the cooking (cooking refers to the reaction to form lithium metal oxide from the metal precursor with a lithium salt) has to be done in expensive, carbon dioxide free gas. We detected that the mixed metal precursors can contain carbonate impurity. During cooking, the carbonate impurity of the precursor tends to form relatively stable and highly undesired lithium carbonate. Therefore, especially in the case of lithium nickel oxide based cathode materials like LNC and NCA it is important to avoid the carbonate impurity in the precursor.

Otherwise, carbonate is a natural impurity in mixed metal precursors. It originates from Na impurity or from reactions with carbon dioxide in the air during the precipitation. It is very difficult to eliminate these natural carbonate impurities in the precursor. The current invention discloses that a heat treatment of the mixed metal precursor at an intermediary temperature allows to efficiently eliminate the carbonate impurity by forming carbonate free metal oxide precursor.

Similar sulfate impurities are natural to the mixed metal hydroxide. They remain from the metal sulfates used during the precipitation reaction. During cooking the sulfate preferably reacts with lithium and forms a highly stable lithium sulfate impurity. The current invention discloses that a heat treatment of the mixed metal precursor at an elevated temperature allows eliminating the sulfate impurity by forming a sulfur free metal oxide precursor.

The heat treatment typically occurs in air. Typical temperatures are 400-900° C., more precisely 500-700° C. to remove carbonate impurities and 700-900° C. to remove sulfur impurities. The exact optimum temperature typically is within this range (typically 400-800° C.) but can be outside. The choice of optimum temperature is the result of an optimization. As an example, the temperature needs to be high enough to effectively remove a large fraction of the carbonate or sulfur impurity. Otherwise in the general case the temperature needs to be low enough to avoid that the reactivity of the final oxide (to prepare single phase lithiated cathode $LiMO_2$) is low. This can be the case if at the elevated temperature a phase separation into several oxides (fx. spinel+rocksalt phase mixture) happens and progresses too much. Air is the natural gas to do the heat treatment. However, it might be preferred to do the heat treatment in special controlled atmosphere. As an example, using inert gas like nitrogen can prevent the oxidation of $M(OH)_2$. In this case the phase separation to spinel-rocksalt phase mixtures is suppressed. Instead of this a single phase mixed rocksalt MO can be achieved which has a better reactivity to form the final single phase $LiMO_2$.

Typical treatment times are 2-12 hours. The optimum time is the result of an optimization and can be longer or shorter. Special methods like fluidized bed heating can allow for short reaction times, long reaction times can for example be preferred if a lowering of the heat treatment temperature is desired in order to prevent excessive phase separation.

After the heat treatment, a final precursor compound is obtained which may have a general formula $(M\text{-oxide})_a \cdot (Al_2O_3)_b$, with $a+(2*b)=1$. In one embodiment $b \leq 0.4$. The embodiments of the aluminum dry-coating process are further described in the following examples:

EXAMPLE 1

1 kg of a Ni—Mn—Co based powder with composition MOOH, $M=Ni_{0.46}Mn_{0.39}Co_{0.15}$ is filled into a mixer (for example a 2L Haensel type Mixer) and 25.5 g of fumed alumina ($Al_2O_3$) powder is added. During mixing for 30 min at 1000 rpm the fumed alumina slowly fades out of sight and a coated MOOH powder, looking very much like the initial powder (black color, small volume) results. With this ratio of quantities precursor/fumed alumina a doping level of aluminum of 5 mol % is achieved.

Then another 25.5 g of fumed alumina is added, and the mixing is continued for 30 min at 1000 rpm, resulting again in a black powder with small volume. No traces, visible to the naked eye, of the fumed alumina remains after the two coating procedures. Obviously, the all or nearly all of the fumed alumina is utilized to cover the precursor particles with a thin, transparent, relatively dense film. By adding this second coating procedure, a doping level of aluminum of 10 mol % is achieved.

Cross-sections of the 10 mol % Aluminum coated MOOH powder for analysis by FESEM are prepared by immersing the dry-coated precursor powder into a polymer followed by polishing.

EXAMPLE 2

In this example, performed according to the general outline of Example 1, a Ni—Co core compound with composition $M(OH)_2$ ($M=Ni_{0.8}Co_{0.15}$) is coated with fumed alumina powder. Two sets of coated samples are prepared. The first set of the coated samples has a doping level of aluminum of 5 mol % (5 mol % Al+0.95 mol % M) after performing only one coating procedure. The second set of samples had a doping level of aluminum of 15 mol % after performing three consecutive coating procedures, adding each time 5 mol % of the fumed alumina per 1 mol of the transition metal. X-ray diffraction patterns reveal that the aluminum coating layer is not amorphous. Thus, the crystal structure of the fumed alumina is maintained during the coating procedures and the core of the $M(OH)_2$ precursor particles is surrounded by a coating layer or shell containing crystalline alumina nanoparticles.

Figure 1:
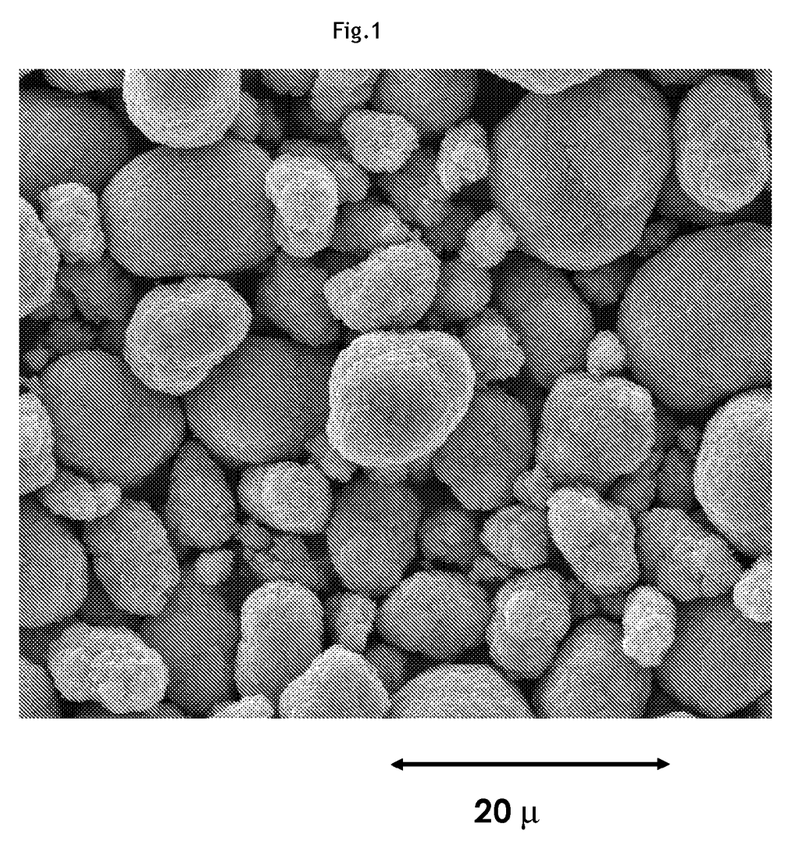
FIG. 1 is a SEM (scanning electron microscope) micrograph of a MOOH precursor core before a first aluminum coating procedure, in accordance with one embodiment of the present invention.
Figure 2:
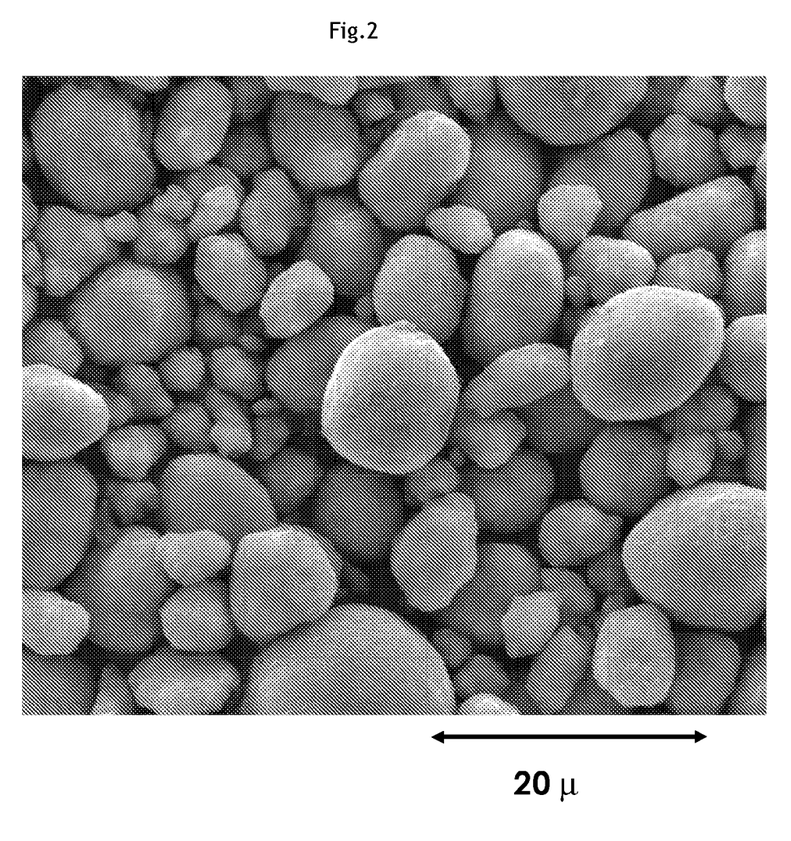
FIG. 2 is a SEM micrograph of the MOOH precursor after a second aluminum coating procedure (10 mol % aluminum), in accordance with one embodiment of the present invention.
Figure 3:
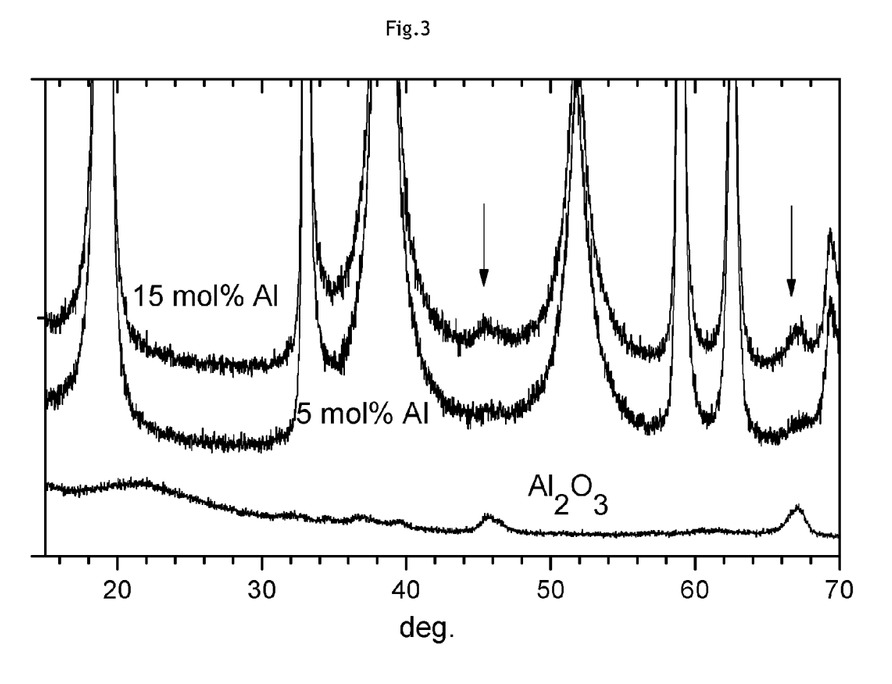
FIG. 3 is a X-ray diffraction pattern of a $M(OH)_2$ precursor after a first and a third aluminum coating procedure (5 mol % and 15 mol % aluminum, respectively), in accordance with one embodiment of the present invention.

Referring to FIGS. 1 and 2, SEM (scanning electron microscope) micrographs of a MOOH precursor before a first aluminum coating procedure and after a second aluminum coating procedure (10 mol % aluminum), respectively, are illustrated according to one embodiment of the present invention and in accordance with the description in Example 1. As can be seen the aluminum coating layers covering the precursor powder particles has high density, is continuous and is smooth. Its thickness varies between 0.1 and 1.5 µm. Referring now to FIG. 3, an exemplary X-ray diffraction pattern of a $M(OH)_2$ precursor after a first and a third aluminum coating procedure (5 mol % (bottom) and 15 mol % (top) aluminum, respectively) is illustrated according to one embodiment of the present invention and in accordance with the description in Example 2. The pattern of alumina is added for reference as bottom line. As can be seen, the surface coating is not amorphous. This becomes apparent for the sample coated with 5 mol % aluminum and is clearly noticeable for the sample coated with 15 mol % aluminum (notice the two arrows pointing at peaks corresponding to the alumina pattern). Thus, the crystal structure of the fumed alumina is maintained during the first and also the second coating procedure and the core of each mixed transition metal precursor particle is covered by a non-amorphous coating layer containing crystalline alumina nanoparticles and, therefore, has a crystalline structure.

Figure 4:
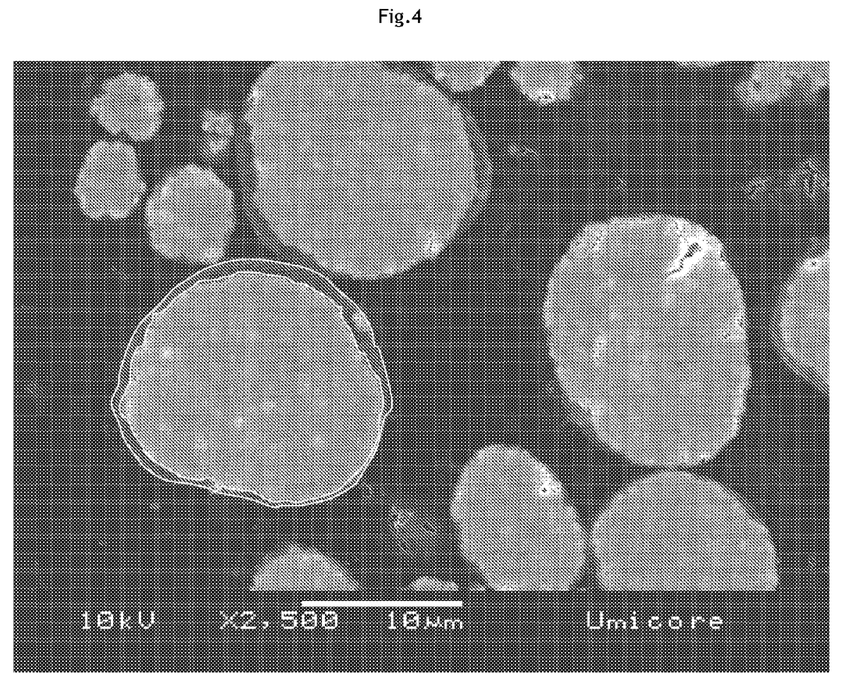
FIG. 4 is a FESEM (field emission scanning electron microscope) micrograph of a polished cross-section of the MOOH precursor after the second aluminum coating procedure (10 mol % aluminum), in accordance with one embodiment of the present invention.

In FIG. 4, a FESEM (field emission scanning electron microscope) micrograph of a polished cross-section of the MOOH precursor after the second aluminum coating procedure (10 mol % aluminum) is shown illustrated according to one embodiment of the present invention and in accordance with the description in Example 1. The micrograph of FIG. 4 is representative for typical results obtained using the dry-coating process of the present invention. As a guide for the eye, two lines were added that assist in illustrating that the coating layer is complete covering the entire outer surface of each of the precursor particles. As can be seen, the coating layer is relatively dense, thus, having a relatively low porosity.

Figure 5:
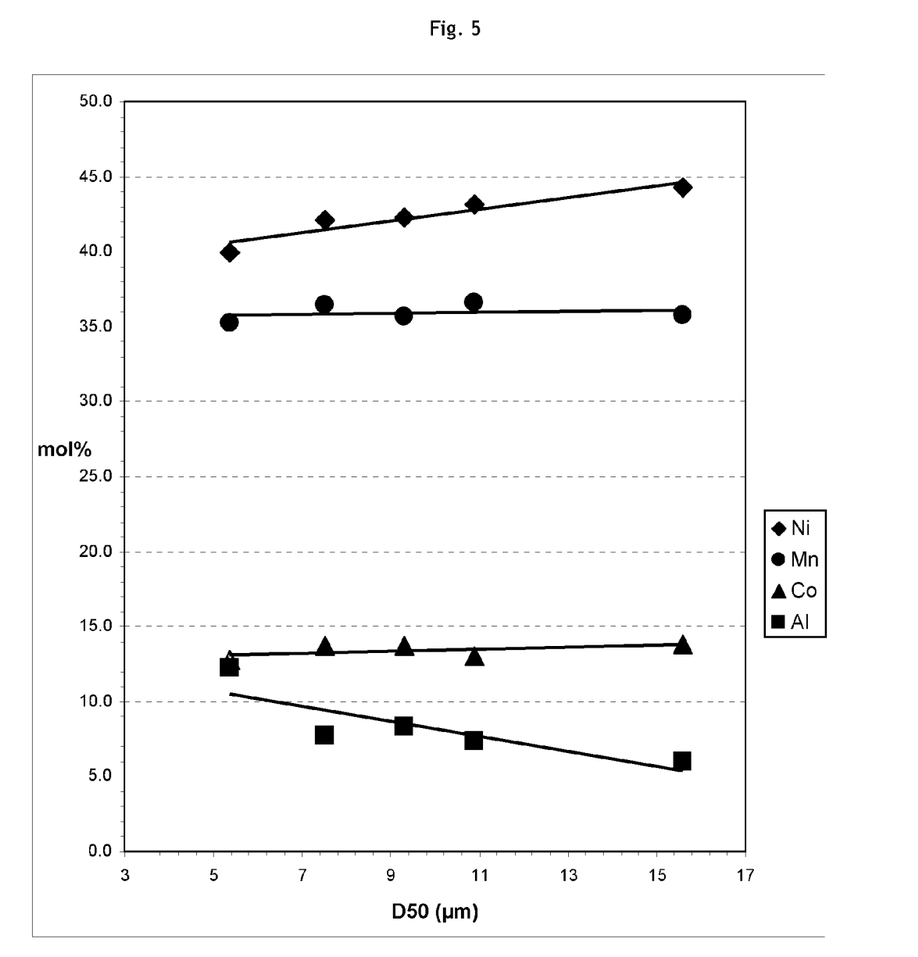
FIG. 5 is a diagram illustrating the metal stoichiometry obtained by ICP-MS (inductively coupled plasma mass spectrometry) from different size fractions of the MOOH precursor after the second aluminum coating procedure (10 mol % aluminum), in accordance with one embodiment of the present invention.

The coating layer may in average not depend on the size of the precursor particles. If the thickness of the coating layer does not change with particle size (as indicated in FIG. 4) than a composition dependency may be expected since larger particles typically have a lower aluminum stoichiometry. Such a composition dependency, where smaller particles have higher aluminum content than larger particles, is in the case of aluminum doped precursors desirable since especially the smaller precursor particles pose a safety concern due to their relatively low thermal stability and since aluminum increases the thermal stability of the precursor in organic electrolytes. To confirm this, the powder was separated into different size fractions by a fractionation experiment and examined by laser diffraction. In such fractionation experiment, a slow laminar flow of the aluminum covered precursor powder immersed in water was used to separate different size fractions. As can be seen in FIG. 5, a size dependent composition of the aluminum coated precursor was confirmed by ICP-MS (inductively coupled plasma mass spectrometry) analysis from different size fractions of the MOOH precursor after the second aluminum coating procedure (10 mol % aluminum) in accordance with the description in Example 1 and the data displayed in Table 1. Smaller particles have a much higher aluminum concentration than larger particles. The aluminum concentration in the particles decreases from about 12 mol % to about 6 mol % as the size (D50 of the PSD) of the coated precursor particles increases from about 5 µm to about 16 µm (see also Table 1).

TABLE 1

Composition (IPC) of the different sized fractions as function of D50 (median) particle size

| Sample | size (μm) | | | mol % | | | |
|---|---|---|---|---|---|---|---|
| | D10 | D50 | D90 | Ni | Mn | Co | Al |
| Non-fractionated | 5.03 | 9.30 | 16.51 | 42.3 | 35.7 | 13.7 | 8.3 |
| Fraction 1 | 3.38 | 5.39 | 8.90 | 39.9 | 35.2 | 12.8 | 12.2 |
| Fraction 3 | 5.40 | 7.52 | 10.51 | 42.1 | 36.5 | 13.7 | 7.7 |
| Fraction 5 | 7.90 | 10.89 | 15.00 | 43.1 | 36.5 | 13.0 | 7.4 |
| Fraction 7 | 11.16 | 15.58 | 21.73 | 44.3 | 35.8 | 13.8 | 6.0 |

Figure 6:
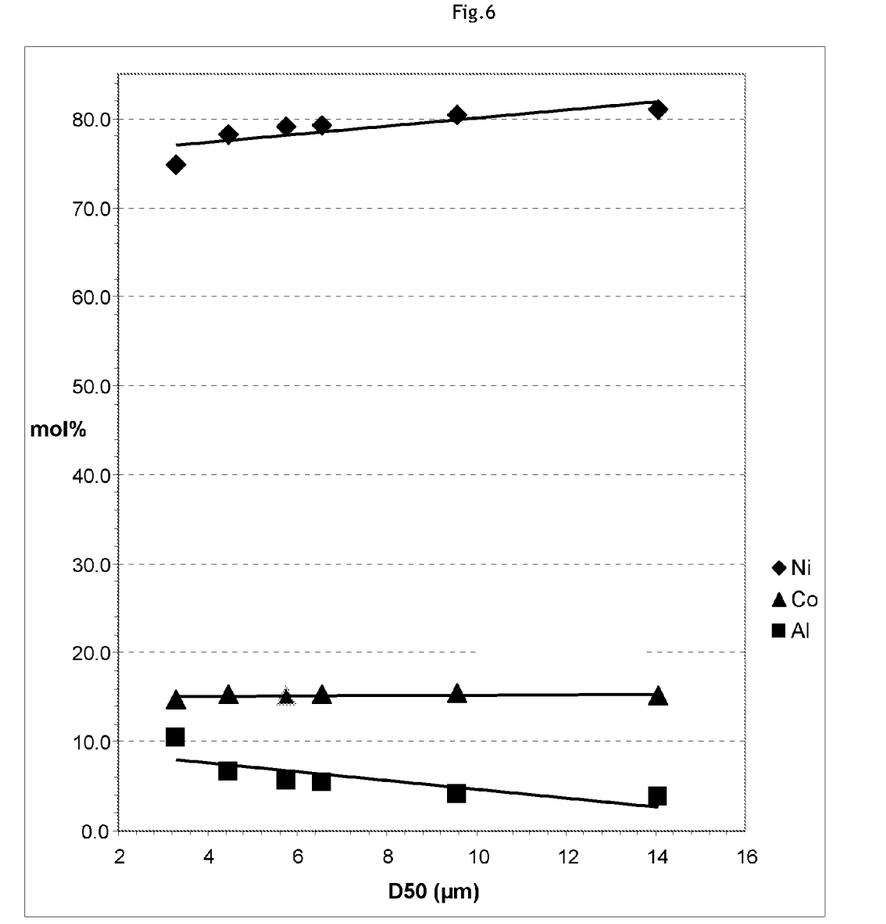
FIG. 6 is a diagram illustrating the metal stoichiometry obtained by ICP-MS from different size fractions of a $M(OH)_2$ precursor after a first aluminum coating procedure (5 mol % aluminum), in accordance with one embodiment of the present invention.

Referring now to FIG. 6, a diagram illustrating the metal stoichiometry obtained by ICP-MS from different size fractions of a $M(OH)_2$ precursor after a first aluminum coating procedure (5 mol % aluminum) is illustrated in accordance with the description in Example 2. The data were obtained by ICP analysis of size fractionized samples similar as described with FIG. 5. As can be seen, the aluminum content decreases with increasing size of the coated precursor particles.

Furthermore, for the preparation of cathode materials from aluminum precursors it may be essential that the aluminum is present in the form of a coating layer, for example, as achieved by the aluminum dry-coating process in accordance with one embodiment of the present invention. As a counter example, if more than a few weight % of alumia is used, and the alumina is not present as a coating layer but present as separate particles in a mixture, then not all alumina is in contact with the active material and after sintering a powder, being a mixture of insufficiently coated active material and remaining alumina is achieved. Thus, a simple solid state reaction, such as heating a blend of an aluminum precursor, a transition metal precursor and a lithium salt may not lead to a well doped final lithiated product without applying excessive sintering, because $Al_2O_3$ (corundum), which is a highly inert phase, forms at relatively low temperatures. The corundum is relatively slow to react with the lithium transition metal oxide and, thus, only if excessive high temperatures or excessive long sintering is applied, may a well doped cathode material be achieved. However, such lithiated materials are typically oversintered, which is indicated by relatively large crystallite size that typically causes poor performance. The larger the alumina content, the more pronounced is this problem. Therefore applying a higher doping level of aluminum requires a good coating. Experiments have shown that if the $Al_2O_3$ is in good contact with the precursor particle in form of a coating layer, which can be obtained, for example, with the above described aluminum dry-coating process in accordance with one embodiment of the present invention, an aluminum coated lithium transitional metal with relatively high Al doping level and high crystallinity may be obtained at relatively low temperatures.

EXAMPLE 3

In another example the present invention provides a heat treatment for alumina coated transition metal oxide $MO_2$, hydroxide $M(OH)_2$ or oxyhydroxide MOOH precursors that allows to reduce undesirable impurities. One application of aluminum dry-coated precursors is the preparation of high nickel cathode materials, such as $LiNi_{0.8}Co_{0.15}Al_{0.05}O_2$. A major problem in the preparation of such cathodes is a contamination by carbonate since some carbonate is usually present in the mixed metal precursors. Another problem is the sulfate impurity, often originating from the precursor production process. Furthermore, it was observed that the sulfates and carbonates are much more stable in the lithiated product (cathode material) ($LiMO_2$) than in the un-lithiated precursor such as MOOH. The reason is the increased thermodynamic stability of $Li_2SO_4$ and $Li_2CO_3$ compared with $MSO_4$ and $MCO_3$. Thus, a heat treatment of the mixed metal precursor may be effective to remove the volatile $SO_4$ and $CO_3$ impurities. Precursor core compounds with composition $Ni_{0.85}Co_{0.15}(OH)_2$ are dry-coated with fumed alumina ($Al_2O_3$) similar as described in Example 2. The composition of the dry-coated precursors is $Ni_{0.85}Co_{0.15}(OH)_2*0.05AlO_{1.5}$. The aluminum dry-coated precursors are heated in air to 400, 600, 800 or 900° C., whereby the core is transformed into a coated oxide. As heat treatment duration, 5 h and 10 h are chosen. After the heat treatment, the sulfate content of the heat treated precursors is measured by ICP and the carbon content is measured by carbon sulfur analysis, using 2 different devices. The results are summarized in Table 2.

TABLE 2

Characteristics of aluminum dry-coated and heat treated $Ni_{0.85}Co_{0.15}(OH)_2$ precursors

| Treatment T of metal precursor | BET $m^2/g$ | $SO_4$ (wt %) pretreated metal precursor | C (ppm) pretreated metal precursor | Weight loss | Color/Structure |
|---|---|---|---|---|---|
| As received | 5.97 | 0.42 | 1189 | 0% | Green/$Ni(OH)_2$ |
| 400° C., 10 h | 68.1 | 0.52 | 697 | 19.07% | Black/NiO |
| 600° C., 10 h | 12.56 | 0.52 | 185 | 20.18% | Green/NiO |
| 800° C., 10 h | 4.85 | 0.16 | 189 | 20.78% | Green/NiO |
| 900° C., 10 h | 3.75 | 0.27 | 162 | 20.92% | Green/NiO |

Obviously, pre-treating a $Ni(OH)_2$ based (or coated) precursor at T>400° C. causes a reduction in carbonate impurity, reaching relatively low values at T≥1600° C., with carbon contents below 200 ppm. The sulfate content decreases dramatically at temperatures above 700-800° C. The weight loss is consistent with the decomposition of $Ni(OH)_2$ to form NiO. X-ray analysis shows that all samples prepared at ≥400° C. are basically single phase NiO, neglecting relatively small peaks due to aluminum containing phases.

Therefore, the core of the precursor particles is a transition metal oxide when the precursor is heat treated at or above 400° C. At intermediary temperature (400° C.) the core is still covered by the remains of the non-amorphous coating layer containing crystalline alumina nano particles. At higher temperature some of the Al diffuses into the core, but the coating remains. Above 800° C. all of the Al will have diffused into the core.

Figure 7:
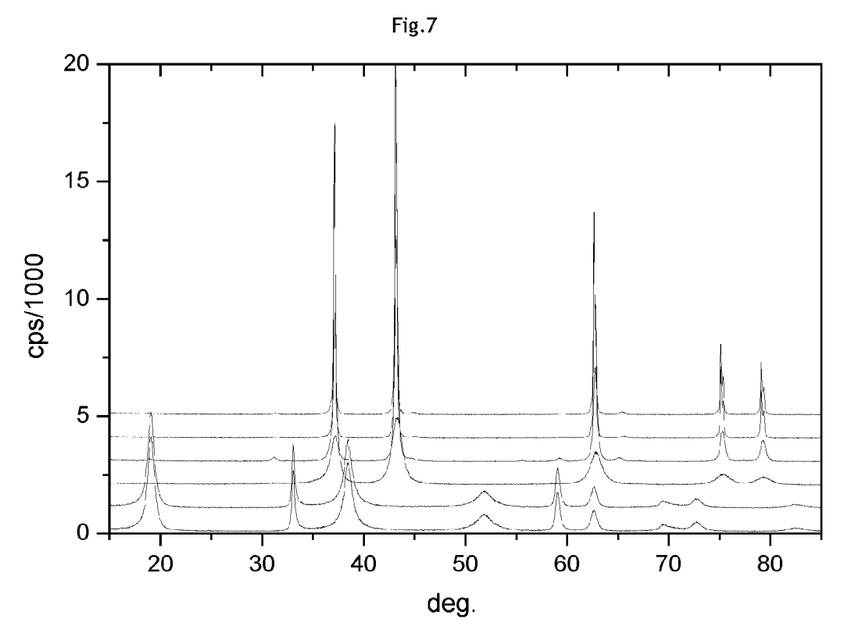
FIG. 7 is a diagram showing the evolution of diffraction pattern of alumina coated $Ni(OH)_2$ based precursor as a function of heat treatment temperature, in accordance with another embodiment of the present invention.

Referring now to FIG. 7, a diagram showing the evolution of diffraction pattern (Intensity in counts per second are given against the scattering angle) of alumina coated $Ni(OH)_2$ based precursors as a function of heat treatment temperature is illustrated according to one embodiment of the present invention and in accordance with the description in Example 2. The bottom diffraction pattern is without Al coating, the next with Al coating but no temperature treatment, then the 4 patterns above are for increasing treatment temperatures from 400° C. to 900° C. At all temperatures a single phase can be observed. Relatively small additional peaks can be observed for the 600° C. sample (3$^{rd}$ pattern from the top on FIG. 7) and may be attributed to traces of an aluminum containing phase, which was not visible yet at 400° C. It will be visible in a high resolution Xray (for example if the scan time is increased). One possible explanation for this appearance at 600° C. is that the crystallinity of the aluminum containing phase increases with rising temperatures and the peaks become visible. At still higher temperatures, at around 800° C., the second phase has disappeared, possibly due to the creation of a Ni—Co—Al solid state solution. The X-ray diffraction pattern of the major phase may be indexed as single phase $Ni(OH)_2$ (not heat treated) or as single phase NiO (heat treated). Obviously, cobalt, as well as aluminum at higher temperatures, forms a solid state solution.

Furthermore, changes in the morphology of the aluminum dry-coated precursors with composition $Ni_{0.85}Co_{0.15}(OH)_2$ occur during the heat treatment, as can be seen in Table 2. At relatively high temperatures, the morphology is spangle-like. The BET surface area has a pronounced maximum at about 400° C. This may be caused by the creation of a mesoporous microstructure. Also, the color changes from green to black to green.

In the following, it will be shown that high quality nickel based cathode materials may be obtained from aluminum dry-coated and heat treated precursor compounds. High quality is related to the requirements by battery manufacturer. It does not only mean "good electrochemical performance". Electrochemical performance is only one of many performance parameters. Additionally the manufacturer might request a low carbonate or sulfur content. Typically, even a slight deterioration of electrochemical performance might be accepted if the impurity level can be reduced. Just like described above, precursor core compounds with composition $Ni_{0.85}Co_{0.15}(OH)_2$ are dry-coated with fumed alumina ($Al_2O_3$) similar as described in Example 2. The composition of the dry-coated precursors is $Ni_{0.85}Co_{0.15}(OH)_2*0.05AlO_{1.5}$. The aluminum dry-coated precursors are heat treated in air at 400, 600, 800 or 900° C. As heat treatment duration, 5 h and 10 h are chosen. To obtain the final lithiated product, the cathode material, the aluminum dry-coated and heat treated precursors are mixed with milled $LiOH*H_2O$ and fired at 750° C. for 10 h in a flow of oxygen. The sintering process may be in the temperature range of 700° C. to 1200° C. and may also be done in a flow of air. Following the sinter process, the electrochemical properties of the lithiated materials are determined according to the following procedure:

Preparation of Coin Cells:

First, slurry of active cathode material, super P (carbon conductive additive) and PVDF (binder) in NMP was prepared. The ratio of active:carbon:PVDF was 90:5:5. The slurry was coated by a doctor blade coater on a sheet of aluminum foil. After drying in air at 120° C. electrodes were roll pressed followed by punching of electrode disks. Coin cells with Li metal anode were assembled in a glove box after further drying of the electrodes in vacuum at 90° C.

Coin Cells were Tested in the Following Manner:
1) The voltage profile is obtained at C/10 rate between 4.3 and 3.0V. (1C rate corresponds to 160 mA/g current)
2) Discharge rate performance (C/5 C2, 1C, 2C, 3C) is measured during cycles 2-6. Charge rate is C/4
3) Cycle 7 and 8 measures the discharge capacity between 4.5 and 3.0V at C/10 and C/1, respectively.
4) From cycle 9 to cycle 30 the cell is cycled between 4.5 and 3.0V. Charge rate is C/4 and discharge rate is C/2.
5) Cycle 31 and cycle 32 re-measure the remaining reversible capacity at C/10 and 1C rate, respectively between 4.5 and 3.0V.

Rate performance is calculated by comparing the ratio of discharge capacity during cycle 2-6 with the discharge capacity at cycle 1. Fading rate is obtained by comparing the remaining reversible capacity at cycle 31 and 6 as well as 32 and 7. The fading rate is expressed as capacity loss per 100 cycles.

The results for the electrochemical testing are shown in Table 3 and the results for a Rietveld analysis of X-ray data are summarized in Table 4.

TABLE 3

Electrochemical testing for coin cells made with heat-treated $Ni_{0.85}Co_{0.15}(OH)_2$ precursors (column: Pre T ° C. = Precursor Treatment ° C. and time) against a reference

| Pre T ° C. | BET m2/g | QD mAh/g | Qirr % | rate 1 C | rate 2 C | rate 3 C | f(1 C) 100cy | f(0.1 C) 100cy |
|---|---|---|---|---|---|---|---|---|
| None | 0.398 | 197.88 | 9.78 | 90.89 | 88.09 | 86.63 | 20.3 | 16.8 |
| 400, 10 h | 0.355 | 198.52 | 9.34 | 91.10 | 88.41 | 86.83 | 14.9 | 12.1 |
| 600, 10 h | 0.351 | 197.24 | 9.68 | 91.23 | 88.69 | 87.04 | 16.3 | 13.1 |
| 800, 10 h | 0.380 | 192.04 | 12.26 | 92.26 | 89.78 | 88.30 | 21.6 | 18.3 |
| 900, 10 h | 0.447 | 190.57 | 12.50 | 92.16 | 89.68 | 88.13 | 25.9 | 21.2 |

As can be seen, the best results, illustrated by a decreased carbon impurity, a high capacity, a good cycling stability or improved rate, may be achieved if the heat treatment is performed at a medium temperature range of about 400-600° C. Thus it is possible to reduce the carbonate impurity of the precursor without sacrificing electrochemical performance of the final product. If the temperature is higher, a reduced cycling stability and lower capacity but also a reduced level of sulfur impurity is obtained. One reason for the poorer performance at higher heat treatment temperatures may be the lower crystallinity. Rietveld refinement of X-ray data (Table 4) shows that at T>600° C. the strain increases significantly while the crystallite size decreases.

TABLE 4

Rietveld analysis of cathode material made with heat-treated $Ni_{0.85}Co_{0.15}(OH)_2$ precursors

| Pre T ° C. | a hex A | c hex A | Ni on Li (%) | size nm | strain | vol A3 | c:a Corr |
|---|---|---|---|---|---|---|---|
| none | 2.86410 | 14.1772 | 0.88 | 138 | 0.107 | 33.5719 | 10.41 |
| 400, 10 h | 2.86410 | 14.1800 | 0.84 | 138 | 0.128 | 33.5786 | 10.61 |
| 600, 10 h | 2.86400 | 14.1792 | 1.10 | 132 | 0.148 | 33.5743 | 10.59 |
| 800, 10 h | 2.86430 | 14.1830 | 1.43 | 119 | 0.21 | 33.5903 | 10.75 |
| 900, 10 h | 2.86470 | 14.1808 | 1.52 | 117 | 0.206 | 33.5945 | 10.45 |

EXAMPLE 4

While the successful application of heat treated precursor compounds for nickel based cathode materials has been demonstrated above, this might not always be the case. If the heat treated precursor decomposes into crystalline coexisting phases, then the reactions to form a crystalline final Li—M—$O_2$ cathode material are very slow and the final lithiated cathode material has a poor performance. For example, if the heat treatment temperature for a $Ni_{0.5}Mn_{0.3}Co_{0.2}O_2$ precursor exceeds 400° C., the decomposition into two major phases—a NiO and a $M_3O_4$ spinel phase—can be observed, and if the temperature exceeds 600° C. the crystalline phase mixture does not allow to achieve high performance product.

Figure 8:
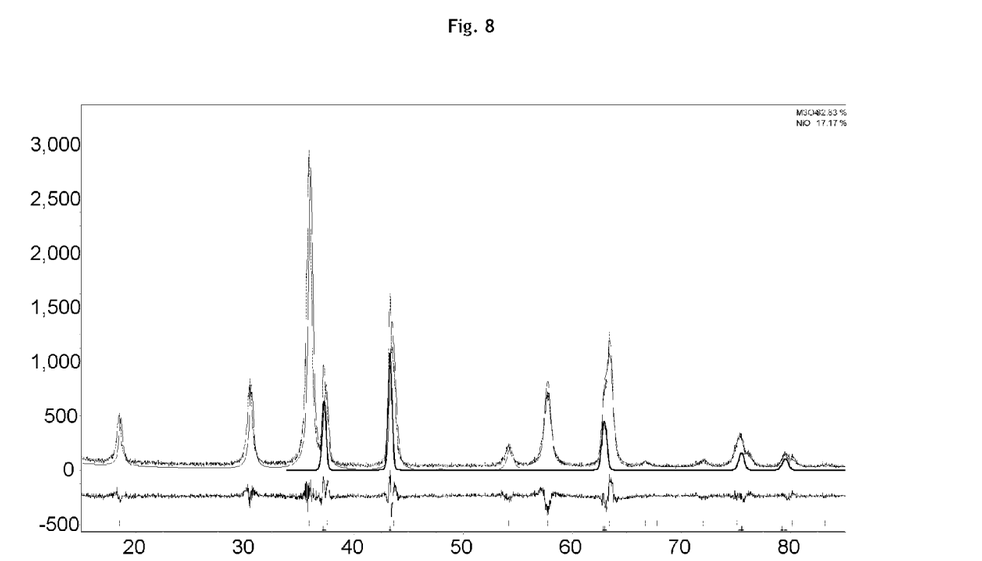
FIG. 8 is a diagram illustrating X-ray diffraction pattern of a $Ni_{0.5}Mn_{0.3}Co_{0.2}O_2$ precursor heat treated at 700° C.

Table 5 shows results of coin cell testing in accordance with one embodiment of the present invention. In the case of a higher treatment temperature, the preheated precursor is a phase mixture of crystalline NiO and $M_3O_4$ spinel, as is illustrated in FIG. 8. Nevertheless, in the case of treatment temperatures <600° C. an excellent electrochemical performance can be achieved from heat treated precursors. Probably at higher temperatures, the phase separation has progressed to a degree that does not allow to achieve good performance. Obviously the crystallite size (domain size) is small enough at 500° C. to allow for the formation of a high crystalline cathode, whereas the larger domain size at 700° C. prevented a final cathode of high crystallinity. FIG. 8 shows a Rietveld refinement of the precursor heat treated at 700° C. The X-ray diffraction pattern is well fitted by a mixture of NiO and $M_3O_4$ spinel. The thin solid line (just under the diffraction pattern) shows the pattern for NiO (17 wt % according to the refinement). Consequently, the reaction to the final $LiMO_2$ is difficult and the final $LiMO_2$ shows poor crystallinity, high strain, and poor electrochemical performance. As can be clearly seen in Table 5, the reversible capacity as well as the rate performance deteriorates at higher treatment temperatures dramatically.

TABLE 5

Coin cell testing of $LiMO_2$ (M = $Ni_{0.5}Mn_{0.3}Co_{0.2}$)
prepared from a heat treated oxide precursor.

| Precursor | | | | Rate (per 0.1 C) | | |
|---|---|---|---|---|---|---|
| Pre T ° C. | Phase composition | DC Q mAh/g | Qirr % | 1 C (%) | 2 C (%) | 3 C (%) |
| 300, 10 h | Single phase | 169.66 | 11.68 | 92.74 | 89.40 | 87.02 |
| 500, 10 h | NiO + M3O4 | 169.57 | 11.95 | 92.62 | 89.23 | 86.87 |
| 700, 10 h | NiO + M3O4 | 161.26 | 13.45 | 92.18 | 88.50 | 85.42 |
| 800, 10 h | NiO + M3O4 | 145.34 | 19.31 | 90.91 | 86.12 | 82.46 |
| 900, 10 h | NiO + M3O4 | 141.23 | 17.98 | 89.74 | 84.94 | 81.18 |

We have shown that a precursor treatment at elevated temperature, typically 500-600° C. is sufficient high to effectively remove the carbonate impurity. During the heat treatment the metal precursor might phase decompose as observed in table 5. At too high temperature the phase decomposition progresses (forming larger separate crystallites) and causes a problem. In this case poor performance cathodes are achieved. At lower temperature, however, the phase decomposition progresses less, occurs at smaller scale, and the small crystallites are sufficient reactive so that the obtained cathode has high crystallinity and shows a good performance. We believe that it always is possible to efficiently remove the carbonate impurity by choosing heat treatment conditions which are strong enough to form the oxide, and release the carbonate but at the same time sufficient weak enough to avoid the full phase deparation into large crystallites.

Comparing the impurity content of the dry-coated and heat treated $Ni_{0.85}Co_{0.15}(OH)_2$ precursors shown in Table 2 and the electrochemical performance of the final lithiated cathode material summarized in Tables 3, 4, and 5 indicates that generally a treatment temperature that is high enough to significantly reduce the sulfur and carbon content is too high to achieve a good electrochemical performance of the final lithiated cathode material. Consequently, only if the Ni content is relatively small, or the precursor compound is free of manganese, may a heat treatment temperature be found that is high enough to significantly reduce sulfur and carbon impurities (>700° C.) and not too high to achieve a good electrochemical performance of the final lithiated cathode material. However, a heat treatment will in almost all cases allow to reduce the carbon impurity without scarifying final cathode electrochemical performance.

Furthermore, the aluminum dry-coated particulate mixed transition metal oxide $MO_2$, metal hydroxide $M(OH)_2$ or oxyhydroxide MOOH precursors in accordance with an advantageous embodiment of the present invention are contrary to known prior art precursors basically free of crystal water. By way of example, hydroxide precursors can be explained as an oxide with one mol crystal water $(M(OH)_2=MO+H_2O)$.

Thus, hydroxides $M(OH)_2$ evolve lots of water and need oxygen.

$M(OH)_2+\frac{1}{2}Li_2CO_3+\frac{1}{4}O_2 \rightarrow LiMO_2+\frac{1}{2}CO_2+H_2O$.

Managing the required large flows of gas (oxygen to the sample, $CO_2$ and $H_2O$ away from the sample) is a problem at large scale. An ideal reaction would be to use 3-valent metal oxide:

$\frac{1}{2}M_2O_3+\frac{1}{2}Li_2CO_3 \rightarrow LiMO_2+\frac{1}{2}CO_2$.

This reaction needs no gas (instead of ¼ mol $O_2$) and it also evolves much less gas (½ mol instead of 1.5 mol). In this way gas flow management can be dramatically simplified. Thus, the aluminum dry-coated and heat treated precursors in accordance with the present invention have the advantage that they require much less gas flow during large scale production, that means that the throughput in a furnace can be increased which dramatically lowers the production cost.

EXAMPLE 5

Finally, the heat treatment of precursors in accordance with above described embodiment of the present invention may in principle not be limited to high nickel based precursors, but may also be applied to precursors that have different compositions, for example, nickel-manganese-cobalt (NMC) mixed hydroxide precursors. In the case of NMC precursors, the carbon impurity is of less interest because it is easily decomposed during preparation of the final lithated product. Therefore, for these materials, the focus may lie on the sulfur impurity in the precursor as well as in the final lithiated product.

For example, mixed metal hydroxide precursors with the composition MOOH with M=$Ni_{0.5}$ $Mn_{0.3}Co_{0.2}$ are heat treated in air at 300, 500, 700, 800 or 900° C. for 10 hours. The precursors are not aluminum dry-coated. Lithiated products are prepared using a Li:M=1.027 stoichiometric ratio (Li precursor: $Li_2CO_3$) and are sintered for 10 h at 940° C. in air. Table 6 shows the sulfur content after heat treatment of the precursor and of the final lithiated product as a function of the heat treatment temperature. As can be seen, heat treating the precursor lowers the sulfur content significantly. It can further be observed that most of the sulfur present in the precursor after heat treatment is maintained during the sinter process preparing the final lithiated product. It may be concluded that sulfur remains as an impurity in a normal solid state solution and that a precursor heat treatment is essential to obtain a final lithiated product with relatively low sulfur content. In the present example final electrochemical performance deteriorate, however battery producer might accept a certain deterioration if low impurities are required. And, of course, for different compositions or modified process conditions the deterioration might be much less.

Compared to carbonate, removal of a sulfate impurity generally requires a higher temperature. At higher temperature, in case the mixed oxide is not thermodynamically stable, a phase separation will progress much further and create large phase separated crystallites. Therefore a removal of sulfur is not always possible because the large phase separated crystallites are relatively inert so the cooking (reaction of the mixed oxide with a lithium source) will result in a poor performance cathode. Therefore, practically the removal of sulfur might be limited to compositions which form a single phase oxide. When cooking the single phase oxide with a lithium source allows obtaining high quality cathodes. For example, sulfur can be removed from $Co(OH)_2$ because single phase cobalt oxide forms. So the condition for an effective removal of sulfur is that the mixed oxide exists. Without going to details, a large variety of single phase mixed monoxides MO can be prepared. Alternatively, a large variety of mixed spinel phases exist. Finally, special compositions like for example NiMnO3 are of interest.

TABLE 6

Sulfur content as a function of heat treatment temperature of a $Ni_{0.5}Mn_{0.3}Co_{0.2}$ precursor.

| Treatment T of metal precursor | $SO_4$ (wt %) in metal precursor | $SO_4$ (wt %) in lithiated product |
|---|---|---|
| As received | 0.379 | |
| 300° C., 10 h | 0.397 | 0.374 |
| 500° C., 10 h | 0.446 | 0.399 |
| 700° C., 10 h | 0.427 | 0.351 |
| 800° C., 10 h | 0.231 | 0.182 |
| 900° C., 10 h | 0.107 | 0.078 |

Conclusion

It can be concluded that the present invention provides particulate mixed transition metal hydroxide $M(OH)_2$ or oxyhydroxide MOOH precursors that have been coated with aluminum during a dry-coating process. The obtained aluminum dry-coated precursors are, for example, suitable for preparation of cathode materials for rechargeable lithium and lithium-ion batteries. By providing an aluminum dry-coating process, higher doping levels of aluminum compared to the known prior art may be achieved. The crystal structure of the fumed alumina may be maintained during the coating procedures and the core of each mixed transition metal precursor particle may be surrounded by a coating layer containing crystalline alumina nano particles. Thus, the morphology of the aluminum dry-coated precursors in accordance with the present invention is improved compared to known prior art precursors.

By providing a heat treatment process for mixed metal precursors that may be combined with the aluminum dry-coating process, novel aluminum containing precursors that may be used to form high quality nickel based cathode materials are obtained. The aluminum dry-coated and heat treated precursors include particles having a transition metal oxide core covered by a non-amorphous aluminum oxide coating layer and have, compared to prior art precursors, relatively low impurity levels of carbonate and/or sulfate, and can be produced at lower cost.

The invention can alternatively be described by the following clauses:

1. A particulate precursor compound for manufacturing an aluminum coated lithium transition metal (M)-oxide powder usable as an active positive electrode material in lithium-ion batteries, each particle of said precursor compound comprising:
   a transition metal (M)-oxide core; and
   a non-amorphous aluminum oxide $Al_2O_3$ coating layer covering said core.
2. The precursor compound of clause 1, characterized in that said precursor compound has a general formula $(M\text{-oxide})_a \cdot (Al_2O_3)_b$, wherein $a+(2*b)=1$, and in that said transition metal (M) is $Ni_xMn_yCo_z$, wherein $0.3 \leq x \leq 1.9$, $0 \leq y \leq 0.45$, and $0 < z \leq 1.4$, $x+y+z=1$; and wherein said transition metal (M) includes further only unavoidable impurities.
3. The precursor compound of clause 2, wherein $b \leq 0.4$.
4. The precursor compound of clause 2, wherein $y=0$.
5. The precursor compound of clause 1, wherein said coating layer contains crystalline alumina nanoparticles.
6. The precursor compound of clause 1, wherein a carbon content of said precursor compound is reduced by a heat treatment of said precursor compound at temperatures above about 400° C. reaching relatively low values at and above about 600° C. and wherein a sulfate content of said precursor compound is reduced by a heat treatment of said precursor at temperatures at and above about 700° C.
7. The precursor compound of clause 6, wherein said sulfate content is lower than about 0.3 wt %.
8. The precursor compound of clause 1, characterized in that said precursor compound is basically free of crystal water.
9. The precursor compound of clause 1, wherein said aluminum concentration in said coating layer decreases as the size of said core increases.
10. A process of preparing a particulate precursor compound for manufacturing an aluminum coated lithium transition metal (M)-oxide powder usable as an active positive electrode material in lithium-ion batteries, comprising the steps of:
    providing for a first quantity of alumina powder having a volume V1;
    providing for a first quantity of transition metal (M)-oxide, (M)-hydroxide or (M)-oxyhydroxide powder as said particulate precursor, having a volume V2;
    mixing said first quantity of alumina powder with said first quantity of transition metal (M)-oxide, (M)-hydroxide or (M)-oxyhydroxide in a first dry-coating procedure, wherein V1+V2=V;
    continue mixing until said volume V decreases to V3 that has about the same value as V1, thereby covering a transition metal (M)-oxide, (M)-hydroxide or (M)-oxyhydroxide core with an non-amorphous aluminum oxide $Al_2O_3$ coating layer; and
    heat treating said core covered by said coating layer at a temperature in a range of about 400-800° C.
11. The process of clause 10, wherein said heat treating step is performed at a temperature in a range of about 400-600° C.
12. The process of clause 10, further including the step of heat treating said core covered by said coating layer at said temperature for duration of 5 hour or 10 hours.
13. The process of clause 10, further including the step of reducing carbon content and sulfate content of said precursor compound.

14. The process of clause 10, further including the step of obtaining an aluminum dry-coated precursor compound, wherein said core is a transition metal oxide and wherein said core is completely covered by said non-amorphous coating layer.

15. The process of clause 10, further comprising the step of mixing said particulate precursor with a lithium precursor compound and sintering the mixture.

The invention claimed is:

1. A particulate precursor compound for manufacturing an aluminum coated lithium transition metal (M)-oxide powder usable as an active positive electrode material in lithium-ion batteries, each particle of said precursor compound comprising:
   a transition metal (M)-oxide core; and
   a non-amorphous aluminum oxide $Al_2O_3$ coating layer covering said core, wherein said particulate precursor has an aluminum doping level equal to or greater than 5 mol%, said doping level being equal to: Al/(Al +M), with Al +M =1,
   wherein said particulate precursor compound has a general formula $(M\text{-oxide})_a \cdot (Al_2O_3)_b$, wherein a+(2*b)=1, and wherein said transition metal (M) is $Ni_xMn_yCo_z$, wherein $0.3 \leq x \leq 0.9$, $0 \leq y \leq 0.45$, and $0 < z \leq 0.4$, x+y+z=1; and wherein said transition metal (M) includes further only unavoidable impurities.

2. The particulate precursor compound of claim 1, wherein $b \leq 0.4$.

3. The particulate precursor compound of claim 1, wherein y=0.

4. The particulate precursor compound of claim 1, wherein said coating layer contains non-amorphous alumina nanoparticles.

5. The particulate precursor compound of claim 1, wherein a carbon content of said precursor compound is reduced by a heat treatment of said precursor compound at temperatures above about 400° C. reaching relatively low values at and above about 600° C. and wherein a sulfate content of said precursor compound is reduced by a heat treatment of said precursor at temperatures at and above aboutn 700° C.

6. The particulate precursor compound of claim 5, wherein said sulfate content is lower than about 0.3 wt %.

7. The particulate precursor compound of claim 1, wherein said precursor compound is free of crystal water.

8. The particulate precursor compound of claim 1, wherein the coating layer has a thickness that does not change with particle size such that relatively smaller particles have a higher aluminum concentration than relatively larger particles of the same particulate precursor compound.

9. A process of preparing the particulate precursor compound of claim 1, comprising:
   providing for a first quantity of alumina powder having a volume VI;
   providing for a first quantity of transition metal (M)-oxide, (M)-hydroxide or (M)-oxyhydroxide powder as said particulate precursor, having a volume V2;
   mixing said first quantity of alumina powder with said first quantity of transition metal (M)-oxide, (M)-hydroxide or (M)-oxyhydroxide in a first dry-coating procedure, wherein V1+V2=V and wherein the first quantity of alumina powder and the first quantity of transition metal (M)-hydroxide or (M)-oxyhydroxide are mixed until said volume V decreases to a volume V3 that has about the same value as VI, thereby covering a transition metal (M)-oxide, (M)-hydroxide or (M)-oxyhydroxide core with a non-amorphous aluminum oxide Al2O3 coating layer; and
   heat treating said core covered by said coating layer at a temperature in a range of about 400-800° C.

10. The process of claim 9, wherein said heat treating is performed at a temperature in a range of about 400-600° C.

11. The process of claim 9, further comprising heat treating said core covered by said coating layer at said temperature for duration of 5 hours or 10 hours.

12. The process of claim 9, further comprising reducing carbon content and sulfate content of said precursor compound.

13. The process of claim 9, further comprising obtaining an aluminum dry-coated precursor compound, wherein said core is a transition metal oxide and wherein said core is completely covered by said non-amorphous coating layer.

14. The process of claim 9, further comprising mixing said particulate precursor compound with a lithium precursor compound and sintering the mixture.

* * * * *

UNITED STATES PATENT AND TRADEMARK OFFICE
CERTIFICATE OF CORRECTION

PATENT NO. : 9,876,226 B2  
APPLICATION NO. : 13/817326  
DATED : January 23, 2018  
INVENTOR(S) : Paulsen et al.

Page 1 of 1

It is certified that error appears in the above-identified patent and that said Letters Patent is hereby corrected as shown below:

In the Claims

Column 17, Claim 5, Line 41, please change "aboutn" to --about--.

Signed and Sealed this
Fifteenth Day of May, 2018

Andrei Iancu
*Director of the United States Patent and Trademark Office*